United States Patent [19]
Ando

[11] Patent Number: 5,870,040
[45] Date of Patent: Feb. 9, 1999

[54] 8/9 CODING APPARATUS AND METHOD OF SAME

[75] Inventor: Hideki Ando, Kanagawa, Japan

[73] Assignee: Sony Corporation, Tokyo, Japan

[21] Appl. No.: 886,581

[22] Filed: Jul. 1, 1997

[30] Foreign Application Priority Data

Jul. 2, 1996 [JP] Japan .................................. 8-172533

[51] Int. Cl.[6] .................................................. H03M 7/00
[52] U.S. Cl. .......................................... 341/106; 341/58
[58] Field of Search .............................. 341/106, 95, 68, 341/58; 375/242, 365; 360/40

[56] References Cited

U.S. PATENT DOCUMENTS

4,775,985  10/1988  Busby ...................................... 375/242

*Primary Examiner*—Brian Young
*Attorney, Agent, or Firm*—Frommer Lawrence & Haug LLP; William S. Frommer

[57] ABSTRACT

An 8/9 coding apparatus which suppresses the DC component of input data to be recorded on a magnetic tape by converting the 8-bit input data to 9-bit coded data, provided with a CDSc table for the CDSc data, that is, the data of the complement of 2 of the cumulative value of bits in a symbol included in coded data based on the input data. In a DSVc adder, CDSc data is cumulatively added by a polarity in accordance with polarity data, DSVc data indicating the complement of 2 of the cumulative value of the bits for every sector is generated, and an MSB bit thereof is output as MSB data to a table selector. The table selector outputs a table switching signal generated based on the polarity data and the MSB data to a data table, a polarity table, and the CDSc table. The tables are selectively used based on this switching signal.

16 Claims, 10 Drawing Sheets

8/9 CODING APPARATUS AND METHOD OF SAME

BACKGROUND OF THE INVENTION

1. Field of the Invention

The present invention relates to an 8/9 coding apparatus used in a digital data recorder.

2. Description of the Related Art

One format for digital data recorders is the ID-1 system described in "ANSI X3.17-1990".

In the recording system of such a digital data recorder, the recording data is subjected to two types of error correction coding by an outer code and an inner code, randomization, 8/9 coding, NRZI(1) modulation, magnetization, and optimization of recording, then is recorded on a recording medium.

Here, the 8/9 coding is for converting a randomized serial byte stream to a 9-bit NRZL word stream. By this conversion, after the next performed NRZI(1) modulation of the 9-bit NRZL word stream, it becomes possible to obtain a recording wave form in which the DC component is suppressed.

Below, an explanation will be made of an 8/9 coding apparatus not covered by this application.

Figure 1:
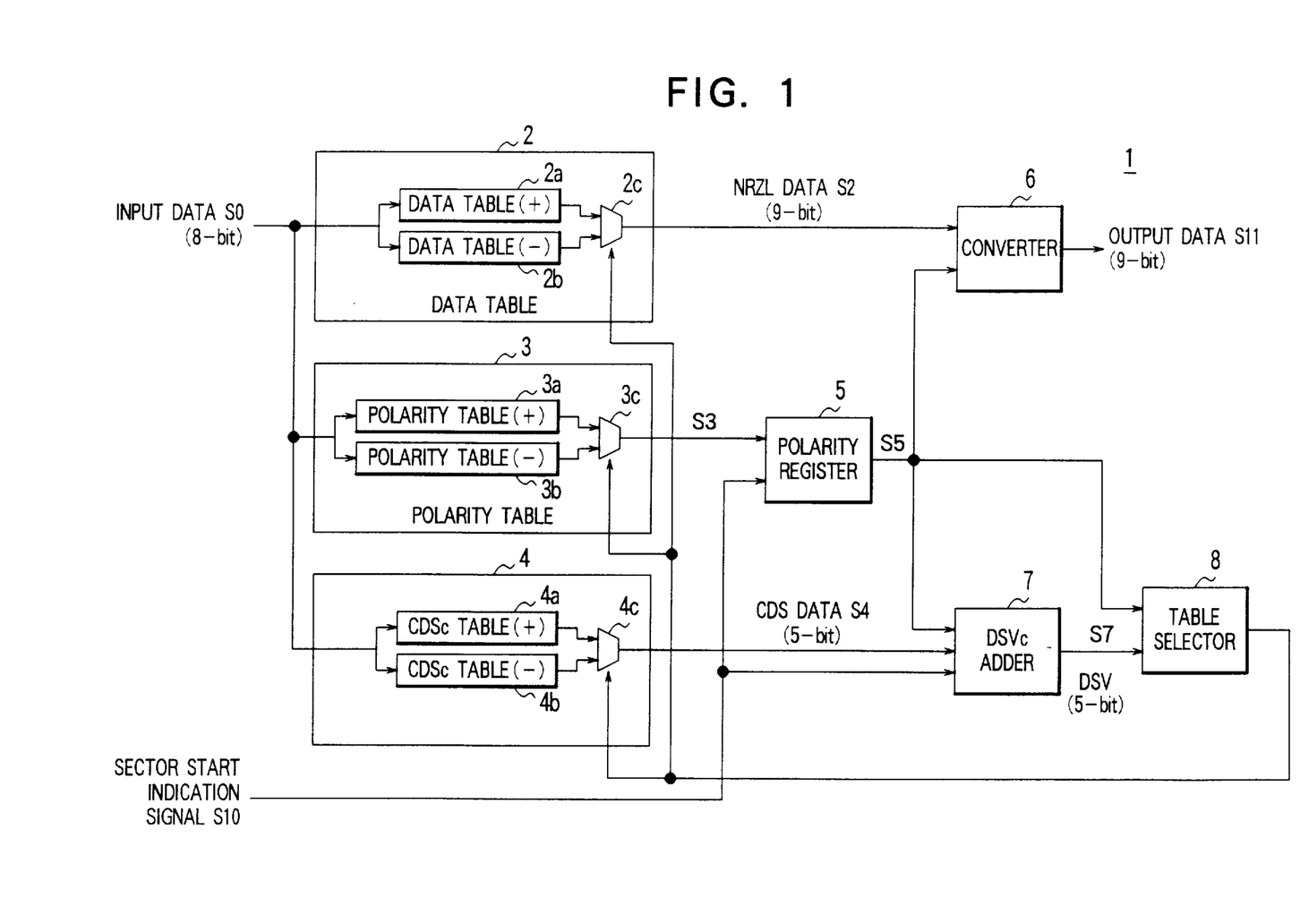
FIG. 1 is a view of the configuration of an 8/9 coding apparatus of an embodiment not covered by this application.

FIG. 1 is a view of the configuration of an 8/9 coding apparatus not covered by this application. The 8/9 coding apparatus 1 has a data table 2, a polarity table 3, a codeword digital sum (CDS) table 4, a polarity register 5, a converter 6, a digital sum variation (DSV) adder 7, and a table selector 8.

The data table 2 is a table for converting the randomized serial byte stream to a 9-bit NRZL word stream and has a data table (+) 2a and a data table (−) 2b which are selectively used by the switching of the selector 2c according to the conditions at the time of the conversion.

The polarity table 3 defines the rules indicating whether or not the signal will be inverted after the 8/9 coding and has a polarity table (+) 3a and a polarity table (−) 3b which are selectively used by the switching of the selector 3c according to the conditions at the time of the conversion.

The CDS table 4 is a table storing the CDS value of the data after the 8/9 coding and has a CDS table (+) 4a and a CDS table (−) 4b which are selectively used by the switching of the selector 4c according to the conditions at the time of the conversion.

Here, the CDS shows the cumulative value of the bits from the head to the tail of the wave form of one NRZI(1) symbol. The cumulative addition is carried out by defining the code "1" of the NRZI(1) as "+1" and defining "0" as "−1".

The DSV is the cumulative value of the values of the recording wave form of the NRZI(1) for all 9-bit symbols contained in one sector. Accordingly, DSV becomes a value obtained by cumulatively adding all 9-bit symbol CDSs contained in one sector.

The polarity register 5 is a register holding the polarity of the current signal and records the polarity inversion data from the polarity table 3.

The converter 6 converts the input signal from NRZL to NRZI.

The DSV adder 7 calculates the DSV value for a period from the head of the sector to the present time as shown in the following Table 1 by using a sector start indication signal S10, the CDS data S4, and the polarity inversion data S5 and holds the result of the calculation.

TABLE 1

| Previous polarity | Next DSV |
|---|---|
| + | DSV − CDS |
| − | DSV + CDS |

The table selector 8 receives as its inputs the polarity inversion data S5 from the polarity register 5 and the DSV data S7 from the DSV adder 7, determines which of the tables of (+) or (−) to be selected based on these data, and outputs the table switching signals to the selectors 2c, 3c, and 4c. At this time, the relationship of the polarity inversion data S5 and DSV data S7 with the tables to be selected next are shown in the following Table 2.

TABLE 2

| Previous state | | Table to be selected next |
|---|---|---|
| DSV | Polarity | |
| + | + | Table (+) |
| + | − | Table (−) |
| − or 0 | + | Table (−) |
| − or 0 | − | Table (+) |

In Table 2, Table (+) indicates that the data table (+) 2a, polarity table (+) 3a, and the CDS table (+) 4a are to be selected. Further, Table (−) indicates that the data table (−) 2b, polarity table (−) 3b, and the CDS table (−) 4b are to be selected.

Figure 2:
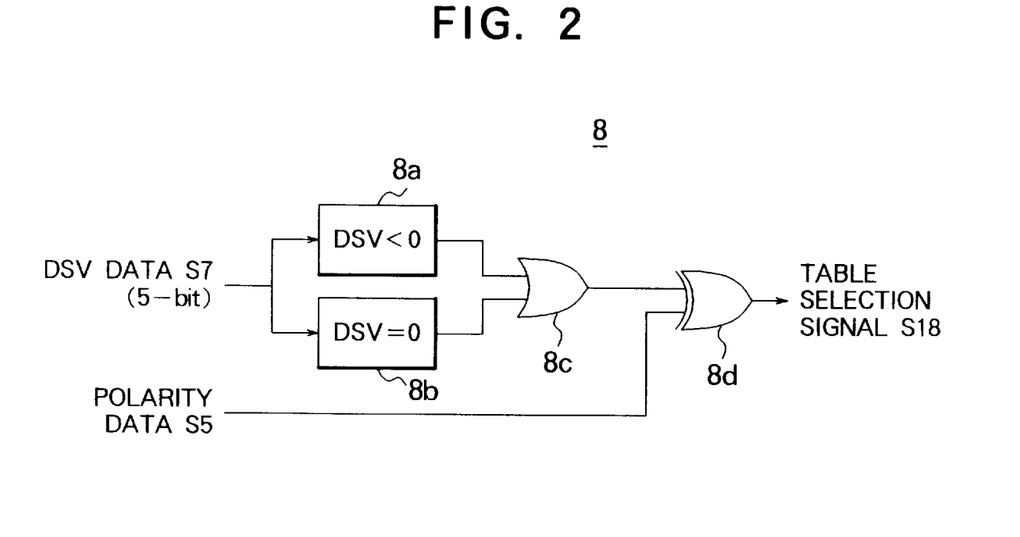
FIG. 2 is a view of the configuration of the table selector shown in FIG. 1.

FIG. 2 is a view of the configuration of the table selector 8.

As shown in FIG. 2, the table selector 8 is constituted by discriminators 8a and 8b for discriminating whether DSV<0 and DSV=0, respectively, an OR circuit 8c, and an exclusive logical OR circuit 8d.

Next, an explanation will be made of the processing of the 8/9 coding apparatus 1 shown in FIG. 1.

Step S1: First, when the sector start indication signal S10 indicates the head of the sector, the polarity register 5 and the DSV adder 7 initialize these values.

Step S2: Next, the table selector 8 outputs the table selecting signal S8 found under the conditions shown in above Table 2 and 4c by using the input polarity inversion data S5 and the DSV data S7 to the selectors 2c, 3c.

By this, in the data table 2, the polarity table 3, and the CDS table 4, either of the tables (+) or (−) are selected.

Step S3: Then, based on these selected tables, in the data table 2, the 9-bit NRZL data S2 is found from the 8-bit input data S0. This NRZL data S2 is converted to the 9-bit NRZI in the converter 6.

Step S4: Based on the selected CDS table, the CDS data S4 corresponding to the input data S0 is output from the CDS table 4 to the DSV adder 7.

Then, at the DSV adder 7, the 5-bit DSV data is generated based on Table 1 by using the polarity inversion data S5, the CDS data S4, and the sector start indication signal S10 and is output to the table selector 8.

Further, based on the selected polarity table, the polarity inversion data S3 corresponding to the input data S0 is output from the polarity table 3 to the polarity register 5. The value of the polarity register 5 is updated by this polarity inversion data S3.

Step S5: Returning to step S2 again, the processing for the next input data S0 is carried out.

Next, an explanation will be made of the conventional 8/9 coding apparatus 21 not having the CDS table.

Figure 3:
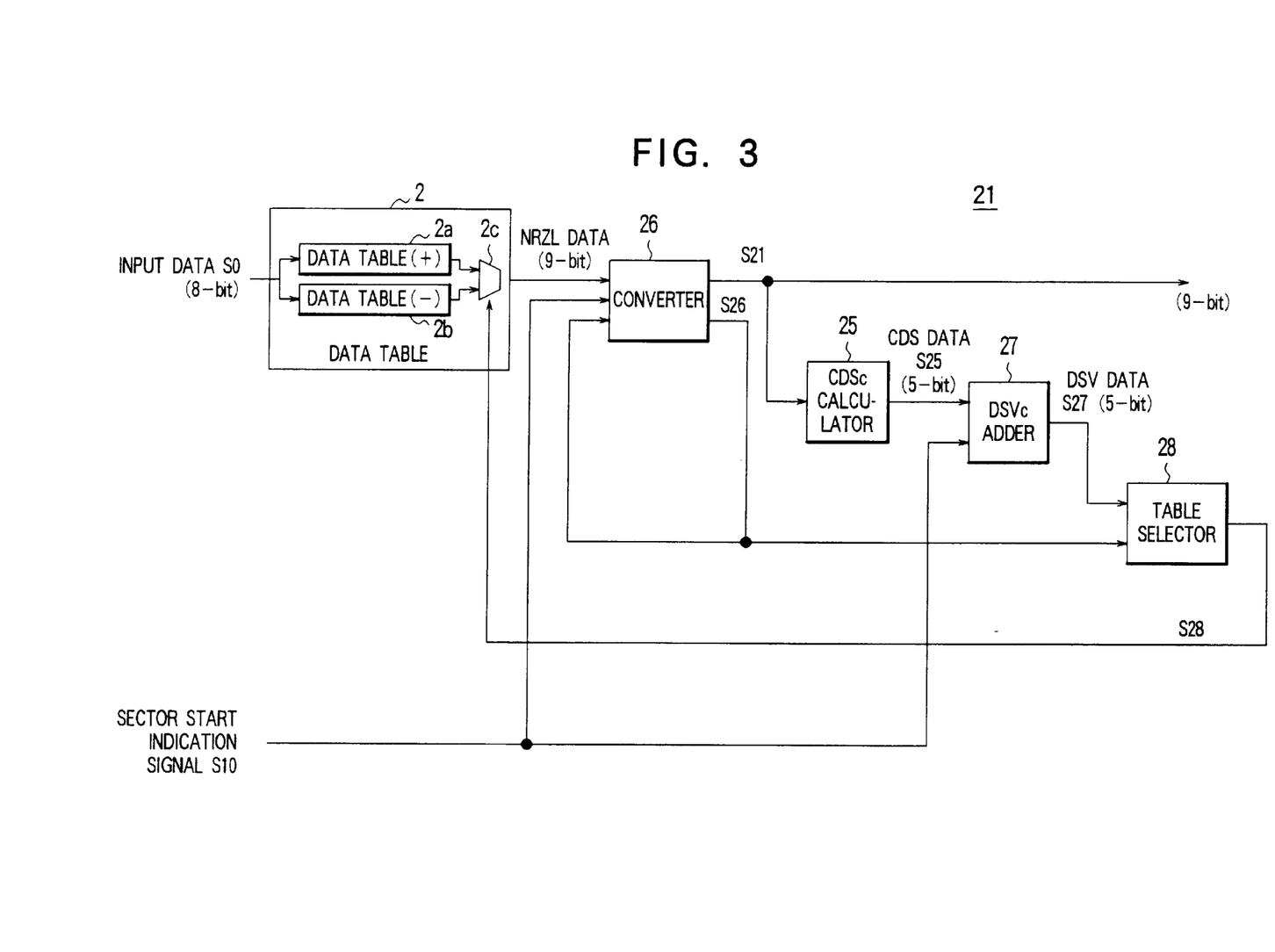
FIG. 3 is a view of the configuration of a conventional 8/9 coding apparatus.

FIG. 3 is a view of the configuration of the conventional 8/9 coding apparatus 21 not having the CDS table.

As shown in FIG. 3, the 8/9 coding apparatus 21 is not provided with the polarity table and the CDS table. Namely, in the CDS calculator 25, the 5-bit CDS data S25 is calculated based on the 9-bit NRZI format output data S21 output from the converter 26. Further, the converter 26 generates the polarity inversion data from the NRZL data S2, feeds back this polarity inversion data S26 again and, at the same time, outputs the same to the table selector 28. The DSV adder 27 generates the 5-bit DSV data based on the CDS data S25 and the sector start indication signal S10 and outputs this DSV data S27 to the table selector 28.

The table selector 28 generates the table selecting signal based on the DSV data S27 and the polarity inversion data S26 and outputs this table selecting signal S28 to the selector 2c of the data table 2.

According to the 8/9 coding apparatus 21, the configuration of the apparatus can be simplified since it is not provided with the polarity table and the CDS table.

In the above 8/9 coding apparatus 1, however, when the table selector 8 performs the selection of the tables under the conditions shown in Table 2, it is necessary to decide which of the conditions of A or B shown in the following (1) stand.

A: DSV is positive

B: DSV is negative or zero (1)

Note that DSV is usually expressed by using a binary value of the complement of 2 or an offset binary value.

However, when performing the above decision shown in (1) for the DSV data expressed by the binary value of the complement of 2 etc. in this way, the condition under which the bit of the DSV data changes and the condition under which the result of decision shown in above (1) changes do not coincide. For this reason, in the table selector 8, the decision of the conditions shown in the following (2) and (3) is carried out with the circuit configuration shown in FIG. 2, the results of these decisions are combined, and then the decision shown in above (1) is carried out.

DSV<0  (2)

DSV=0  (3)

Namely, the table selector 8 performs the decisions as shown in the following (4) and (5) by using the results of the decisions of the conditions of the above (2) and (3).

| | When "(2) is false" and "(3) is false", A of the above (1) stands |
|---|---|
| (4) | |
| | When "(2) is true" or (3) is true", B of the above (1) stands |
| (5) | |

However, since the table selector 8 has to carry out such a complex operation, there is a problem in that the circuit configuration becomes complex as shown in FIG. 2 and, at the same time, the processing time becomes long.

Further, in the above 8/9 coding apparatus 1, the DSV data S7 output from the DSV adder 7 becomes a value within a range of from −8 to +9 at the punctuation of the input data words when including the influence of the Sync pattern. For this reason, the DSV adder 7 is required to have a 5-bit addition, subtraction, initialization, and Sync part processing function.

Further, in the above 8/9 coding apparatus 1, the CDS data recorded in the CDS table 4 has a value within a range of from −6 to +8, therefore 5 bits become necessary to express the CDS data by a binary value.

A similar problem occurs also in the 8/9 coding apparatus 21 explained above referring to FIG. 3.

SUMMARY OF THE INVENTION

The present invention was made in consideration with the above related art and has as an object thereof to provide an 8/9 coding apparatus with which the bit length of the data to be handled can be reduced, the circuit configuration is made simpler, and high speed processing is possible and a method of the same.

According to a first aspect of the present invention, there is provided an 8/9 coding apparatus which suppresses the DC component of input data to be recorded on a magnetic tape by converting the 8-bit input data to 9-bit coded data, comprising a complement digital sum variation (DSV) calculating means for calculating a complement DSV from a complement of 2 of a code word digital sum (CDS) found from a change in a wave form of an NRZI modulated 9-bit word (complement CDS), a table selecting signal generating means for receiving as input a most significant bit (MSB) of the complement DSV output from the complement DSV calculating means and polarity data relating to inversion of the polarity of the input data and generating table selecting signal based on rules of conversion for converting 8-bit input data to 9-bit coded data, and a data table having a first data table and a second data table which are selectively used in accordance with the table selecting signal generated by the table selecting signal generating means and indicate a correspondence between 8-bit input data and 9-bit coded data.

Preferably, the apparatus further comprises a complement CDS table having a first complement CDS table and a second complement CDS table which are selectively used in accordance with the table selecting signal based on the rules of conversion for converting the 8-bit input data to the 9-bit coded data.

Preferably, the apparatus further comprises a complement CDS calculating means for calculating the complement CDS from the 9-bit coded data output from the data table.

According to a second aspect of the present invention, there is provided an 8/9 coding apparatus which suppresses the DC component of input data to be recorded on a magnetic tape by converting the 8-bit input data to 9-bit coded data, comprising a table of a code word digital sum (CDS) found from a change in a wave form of an NRZ modulated 9-bit word, said CDS table having a first CDS table and a second CDS table which are selectively used in accordance with a table selecting signal based on rules of conversion for converting the 8-bit input data to the 9-bit coded data, a table of a complement of 2 of the above CDS (complement CDS) having a first complement CDS table and a second complement CDS table which are selectively used in accordance with the table selecting signal based on the rules of conversion for converting the 8-bit input data to the 9-bit coded data, and a selecting means for selectively outputting the CDS from the CDS table and the complement CDS from the complement CDS table in accordance with polarity data relating to inversion of polarity of the input data.

According to a third aspect of the present invention, there is provided an 8/9 coding apparatus which suppresses the DC component of input data to be recorded on a magnetic tape by converting the 8-bit input data to 9-bit coded data, comprising a means for calculating a code word digital sum (CDS) found from a change in a wave form of an NRZ modulated 9-bit word, a means for calculating a complement of 2 of the CDS, that is, a complement CDS, and a selecting means for selectively outputting the CDS from the CDS calculating means and the complement CDS from the complement CDS calculating means in accordance with polarity data relating to inversion of polarity of the input data.

Preferably, the apparatus of the first preferred mode of the first aspect of the invention is further provided with a CDS table having a first CDS table and a second CDS table which are selectively used in accordance with the table selecting signal based on the rules of conversion for converting the 8-bit input data to the 9-bit coded data, and a selecting means for selectively outputting the CDS from the CDS table and the complement CDS from the complement CDS table in accordance with polarity data relating to inversion of polarity of the input data.

Preferably, the apparatus of the second preferred mode of the first aspect of the invention is further provided with a CDS calculating means for calculating the CDS from the 9-bit coded data output from said data table based on the rules of conversion for converting 8-bit input data to 9-bit coded data and a selecting means for selectively outputting the CDS from the CDS calculating means and the complement CDS from the complement CDS calculating means in accordance with polarity data relating to inversion of the polarity of the input data.

According to a fourth aspect of the present invention, there is provided a 8/9 coding method which suppresses the DC component of input data for recording on a magnetic tape by converting the 8-bit input data to 9-bit coded data, comprising the steps of finding a complement code word digital sum (CDS), that is, a complement of 2 of a CDS found from a change in a wave form of an NRZ modulated 9-bit word, calculating a complement digital sum variation (DSV) from the value of the complement CDS, receiving as input a most significant bit (MSB) of the complement DSV and polarity data relating to inversion of the polarity of the input data and generating a table selecting signal for selecting a table based on rules of conversion for converting 8-bit input data to 9-bit coded data, and selecting using a first data table and a second data table of a data table which indicate a correspondence between 8-bit input data and 9-bit coded data in accordance with the table selecting signal.

According to a fifth aspect of the present invention, there is provided an 8/9 coding apparatus which suppresses the DC component of input data to be recorded on a magnetic tape by converting the 8-bit input data to 9-bit coded data, comprising a negative digital sum variation (DSVn) calculating means for calculating a DSVn from a value of a negative complement code word digital sum (CDSn) obtained by multiplying by minus 1 a CDS found from a change in a wave form of an NRZ modulated 9-bit word, a table selecting signal generating means for receiving as input a most significant bit (MSB) of the DSVn output from the DSVn calculating means and polarity data relating to inversion of the polarity of the input data and generating a table selecting signal based on rules of conversion for converting 8-bit input data to 9-bit coded data, and a data table having a first data table and a second data table which are selectively used in accordance with said table selecting signal generated by the table selecting signal generating means and indicate a correspondence between 8-bit input data and 9-bit coded data.

Preferably, the apparatus further comprises a CDSn table having a first CDSn table and a second CDSn table which are selectively used in accordance with the table selecting signal based on the rules of conversion for converting the 8-bit input data to the 9-bit coded data.

Preferably, the apparatus further comprises a CDSn calculating means for calculating the CDSn from the 9-bit coded data output from the data table.

According to a sixth aspect of the present invention, there is provided an 8/9 coding apparatus which suppresses the DC component of input data to be recorded on a magnetic tape by converting the 8-bit input data to 9-bit coded data, comprising a table of a code word digital sum (CDS) found from a change in a wave form of an NRZ modulated 9-bit word, said CDS table having a first CDS table and a second CDS table which are selectively used in accordance with a table selecting signal based on rules of conversion for converting the 8-bit input data to the 9-bit coded data, a table of a negative CDS (CDSn) obtained by multiplying the CDS by minus 1, the CDSn table having a first CDSn table and a second CDSm table which are selectively used in accordance with the table selecting signal based on the rules of conversion for converting the 8-bit input data to the 9-bit coded data, and a selecting means for selectively outputting the CDS from the CDS table and the CDSn from the CDSn table in accordance with polarity data relating to inversion of polarity of the input data.

According to a seventh aspect of the present invention, there is provided an 8/9 coding apparatus which suppresses the DC component of input data to be recorded on a magnetic tape by converting the 8-bit input data to 9-bit coded data, comprising a means for calculating a code word digital sum (CDS) found from a change in a wave form of an NRZ modulated 9-bit word, a means for calculating a negative CDS (CDSn) by multiplying the CDS by minus 1, and a selecting means for selectively outputting the CDS from said CDS calculating means and the CDSn from the CDSn calculating means in accordance with polarity data relating to inversion of polarity of the input data.

Preferably, the first preferred mode of the fifth aspect of the invention further comprises a CDS table having a first CDS table and a second CDS table which are selectively used in accordance with the table selecting signal based on the rules of conversion for converting the 8-bit input data to the 9-bit coded data, and a selecting means for selectively outputting the CDS from the CDS table and the CDSn from the CDSn table in accordance with polarity data relating to inversion of polarity of the input data.

Preferably, the second preferred mode of the fifth aspect of the invention further comprises a CDS calculating means for calculating said CDS from the 9-bit coded data output from said data table by based on the rules of conversion for converting 8-bit input data to 9-bit coded data and a selecting means for selectively outputting the CDS from the CDS calculating means and the CDSn from the CDSn calculating means in accordance with polarity data relating to inversion of the polarity of the input data.

According to an eighth aspect of the present invention, there is provided an 8/9 coding method which suppresses the DC component of input data for recording on a magnetic tape by converting the 8-bit input data to 9-bit coded data, comprising the steps of finding a negative complement code word digital sum (CDSn) obtained by multiplying a CDS found from a change in a wave form of an NRZ modulated 9-bit word by minus 1, calculating a complement digital sum variation (DSV) from the value of the complement CDS, receiving as input a most significant bit (MSB) of the complement DSV and polarity data relating to inversion of the polarity of the input data and generating a table selecting signal for selecting a table based on rules of conversion for converting 8-bit input data to 9-bit coded data, and selecting using a first data table and a second data table of a data table in accordance with the table selecting signal.

BRIEF DESCRIPTION OF THE DRAWINGS

These and other objects and features of the present invention will become clearer from the following description of the preferred embodiments given with reference to the accompanying figures, in which.

DESCRIPTION OF THE PREFERRED EMBODIMENTS

Below, an explanation will be made of a digital data recorder according to an embodiment of the present invention.

This digital data recorder adopts the D1 system for performing the recording and playback of the component signal. In the recording system, the recording data is subjected to two types of error correction coding by the outer code and inner code, randomization, 8/9 coding, NRZI(1) modulation, magnetization, and optimization of recording and then recorded on the recording medium.

At this time, in the error correction coding, the recording data is divided into blocks of a predetermined length, and a parity code for the outer code is generated by using Reed Solomon coding. Next, a predetermined number of outer codes are collected, words at the same position in these blocks are gathered, and a parity code for the inner code is generated with respect to this.

Then, two inner codes are combined, the ID code and the synchronization code are added to this, and the result is defined as one synchronization code block. Here, exactly 320 synchronization code blocks are collected and are defined as one track's worth of the recording video code. The recording video code is divided into two in one track. Each part is referred to as a "sector".

Next, special codes which are respectively referred to as a preamble and postamble are allocated to the head and tail of each sector.

Further, in the randomization, sector data regions of an ID code, an auxiliary data, a source information, the inner code, etc. are subjected to randomization, but the preamble, run-up sequence, Sync pattern, etc. are not randomized.

Below, a detailed explanation will be made of the 8/9 coding apparatus used in the digital data recorder of the present embodiment.

First Embodiment

Figure 4:
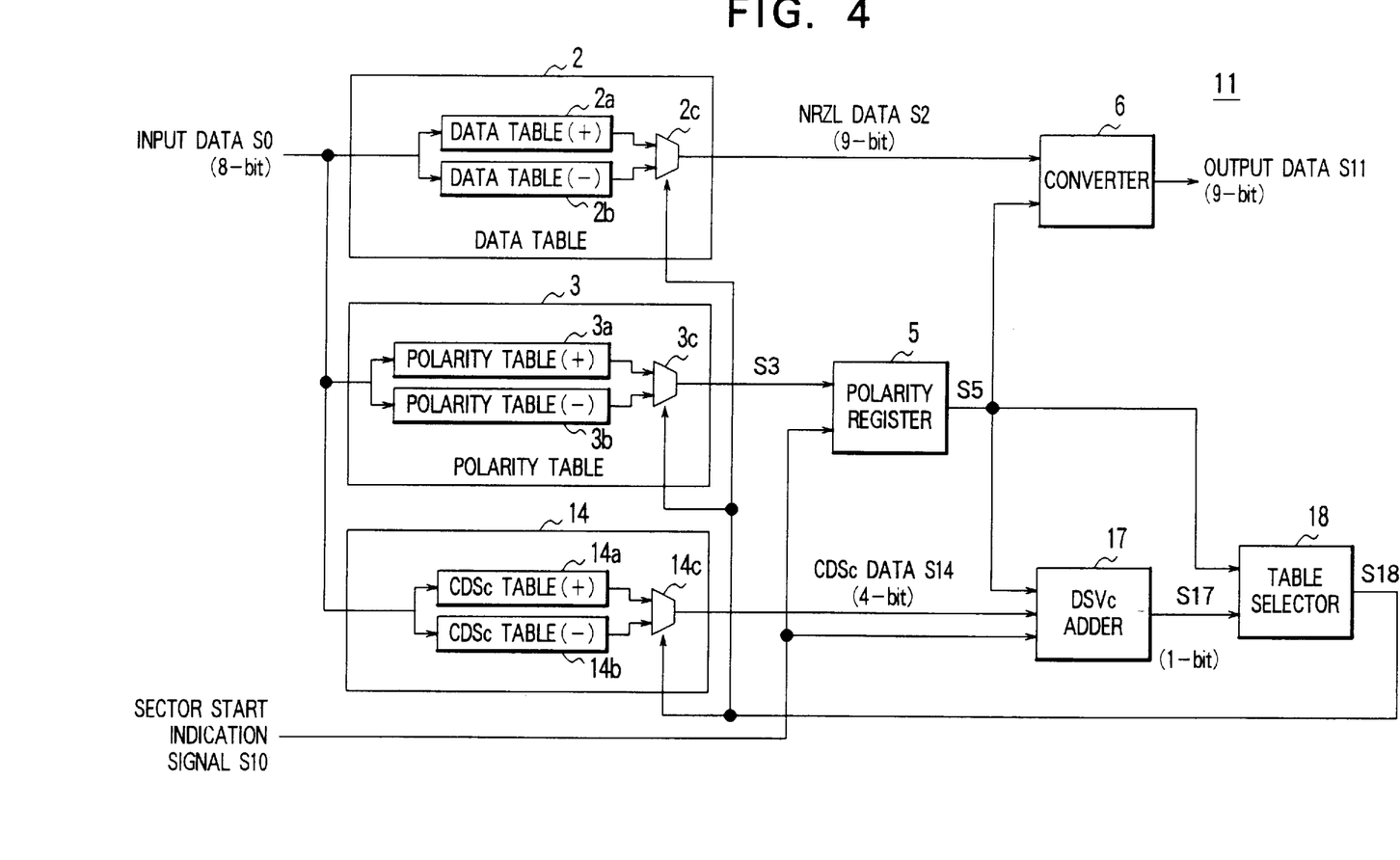
FIG. 4 is a view of the configuration of an 8/9 coding apparatus of a first embodiment of the present invention.

FIG. 4 is a view of the configuration of an 8/9 coding apparatus 11 of the present embodiment.

The 8/9 coding apparatus 11 has the data table 2, a polarity table 3, a CDSc table 14, a polarity register 5, a converter 6, a DSVc adder 17, and a table selector 18.

The data table 2 is a table for converting the randomized serial byte stream, that is, the input data S0, into a 9-bit NRZL word stream and has a data table (+) 2a and a data table (−) 2b which are selectively used by the switching of the selector 2c according to the conditions at the time of conversion.

The polarity table 3 defines the rules indicating whether or not the signal is to be inverted after the 8/9 coding and has a polarity table (+) 3a and a polarity table (−) 3b which are selectively used by the switching of the selector 3c according to the conditions at the time of conversion.

The CDSc table 14 is a table storing the CDSc values of the data after the 8/9 coding and has a CDSc table (+) 14a and a CDSc table (−) 14b which are selectively used by the switching of the selector 14c according to the conditions at the time of the conversion.

Here, CDSc is the data of the complement of 2 of the CDS. The value of the CDSc is within the range of −8 to +6, so can be expressed by a 4-bit binary value. Therefore, compared with the CDS table, the CDSc table can be reduced to ⅘ the size.

The polarity register 5 is a register holding the polarity of the current signal and records the polarity inversion data S3 from the polarity table 3.

The converter 6 converts the input signal from NRZL to NRZI.

The DSVc adder 17 calculates the DSVc value for a period from the head of the sector to the present time as shown in the following Table 3 by using the sector start indication signal S10, the CDSc data S14, and the polarity inversion data S5 and holds the result of the calculation. Here, DSVc is the data of the complement of 2 of the DSV—which is the cumulative value of the bits for one sector.

TABLE 3

| Previous polarity | Next DSVc |
| --- | --- |
| + | DSVc − CDSc |
| − | DSVc + CDSc |

The table selector 18 receives as its inputs the polarity inversion data S5 from the polarity register 5 and the MSB data S17 of the DSVc data from the DSVc adder 17, determines which of the tables (+) or (−) should be selected based on these data, and outputs the table switching signals S18 to the selectors 2c, 3c, and 14c. At this time, the relationship of the polarity inversion data S5 and DSVc data S17 with the tables to be selected next is shown in the following Table 4.

TABLE 4

| Previous state | | Table to be selected next |
|---|---|---|
| DSVc | Polarity | |
| − | + | Table (+) |
| − | − | Table (−) |
| + or 0 | + | Table (−) |
| + or 0 | − | Table (+) |

In Table 4, Table (+) indicates that the data table (+) 2a, the polarity table (+) 3a, and the CDSc table (+) 14a are to be selected. Further, Table (−) indicates that the data table (−) 2b, the polarity table (−) 3b, and the CDSc table (−) 14b are to be selected.

Here, when the table selector 18 selects the tables under the conditions shown in the above Table 4, it is decided which of the conditions of C or D shown in the following expression (6) stand.

C: DSVc is negative
D: DSVc is positive or zero
(6)

Here, where the complement binary value of 2 or offset binary expression is used, the relationship between the conditions of the DSVc and the most significant bit (MSB, code bit) of DSVc becomes as shown in following Table 5.

TABLE 5

| | MSB of DSVc | |
|---|---|---|
| DSV c | Complement of 2 | Offset |
| − | 1 | 0 |
| + or 0 | 0 | 1 |

As seen from Table 4 and Table 5, in the 8/9 coding apparatus 11, in both of the case of adopting the complement binary value of 2 of CDS and the case of adopting the offset binary expression, if the most significant bit of DSVc changes to 1 or 0, the DSVc will change to the condition of C or D shown in the above expression (6) in correspondence with this. Therefore, if the rules for selection of the table selector 18 are made the conditions shown in Table 4, it is possible to omit the circuit relating to the DSVc of Table 4.

Figure 5:
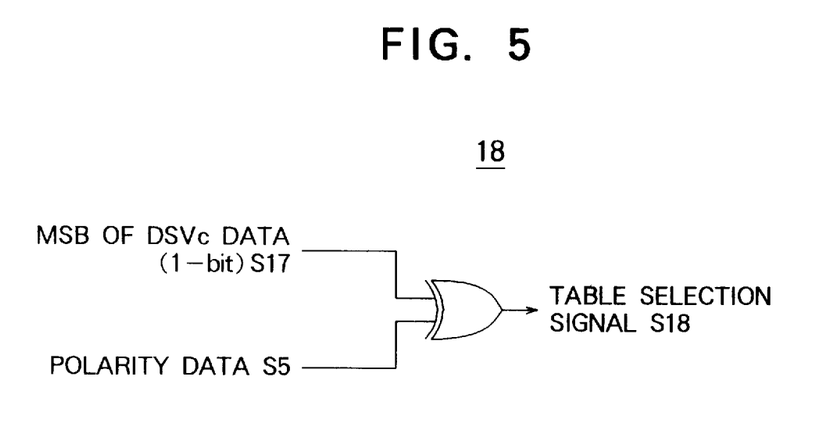
FIG. 5 is a view of the configuration of a table selector shown in FIG. 4.

FIG. 5 is a view of the configuration of the circuit of the table selector 18 where the DSVc data is expressed by using the complement binary value of 2.

As shown in FIG. 5, the table selector 18 receives as its inputs the 1-bit MSB data S17 of the DSVc data and the polarity inversion data S5, calculates the exclusive logical OR of them, and outputs the result of this calculation as the table selecting signal S18.

At this time, the polarity inversion data S5 becomes "0" when (+) is indicated and becomes "1" when (−) is indicated.

By this, the table selecting signal S18 becomes "1" when the table (+) is to be selected and becomes "0" when the table (−) is to be selected:

Next, an explanation will be made of the processing of the 8/9 coding apparatus 11 shown in FIG. 4.

Step S11: First, when the sector start indication signal S10 indicates the head of the sector, the polarity register 5 and the DSVc adder 17 initialize these values.

Step S12: Next, the table selector 18 outputs the table selecting signal S18 found under the conditions shown in Table 4 by using the input polarity inversion data S5 and MSB data S17 of the DSVc data to the selectors 2c, 3c, and 14c.

By this, the selection of tables is carried out in the data table 2, the polarity table 3, and the CDSc table 14.

Step S13: Then, in the data table 2, based on the selected data tables 2a and 2b, the 9-bit NRZL data S2 is found from the 8-bit input data S0. This NRZL data S2 is converted to the 9-bit NRZI data S1 at the converter 6.

Step S14: Based on the selected CDSc table, the CDSc data S14 corresponding to the input data S0 is output from the CDSc table 14 to the DSVc adder 17.

Then, at the DSVc adder 17, the DSVc data is generated from the polarity inversion data S5, the CDSc data S14, and the sector start indication signal S10 based on Table 3, and the MSB data S18 is output to the table selector 18.

Further, based on the selected polarity table, the polarity inversion data S3 corresponding to the input data S0 is output from the polarity table 3 to the polarity register 5. The value of the polarity register 5 is updated by this polarity inversion data S3.

Step S15: Returning to step S12 again, the processing for the next input data S0 is carried out.

As explained above, according to the 8/9 coding apparatus 11, the configuration of the table selector 18 can be simplified as shown in FIG. 5. Further, since the DSVc adder 17 handles 4-bit CDSc data S14, it is possible to simplify the configuration and shorten the signal transmission path. As a result, a reduction of the production costs and an improvement of the processing speed can be achieved.

Second Embodiment

First, an explanation will be made of an 8/9 coding apparatus not having a CDS table.

FIG. 3 is a view of the configuration of an 8/9 coding apparatus 21 not having a CDS table.

As shown in FIG. 3, the 8/9 coding apparatus 21 is not provided with the polarity table and the CDSc table unlike the 8/9 coding apparatus 1 shown in FIG. 1 and generates the CDS data inside the apparatus.

Figure 6:
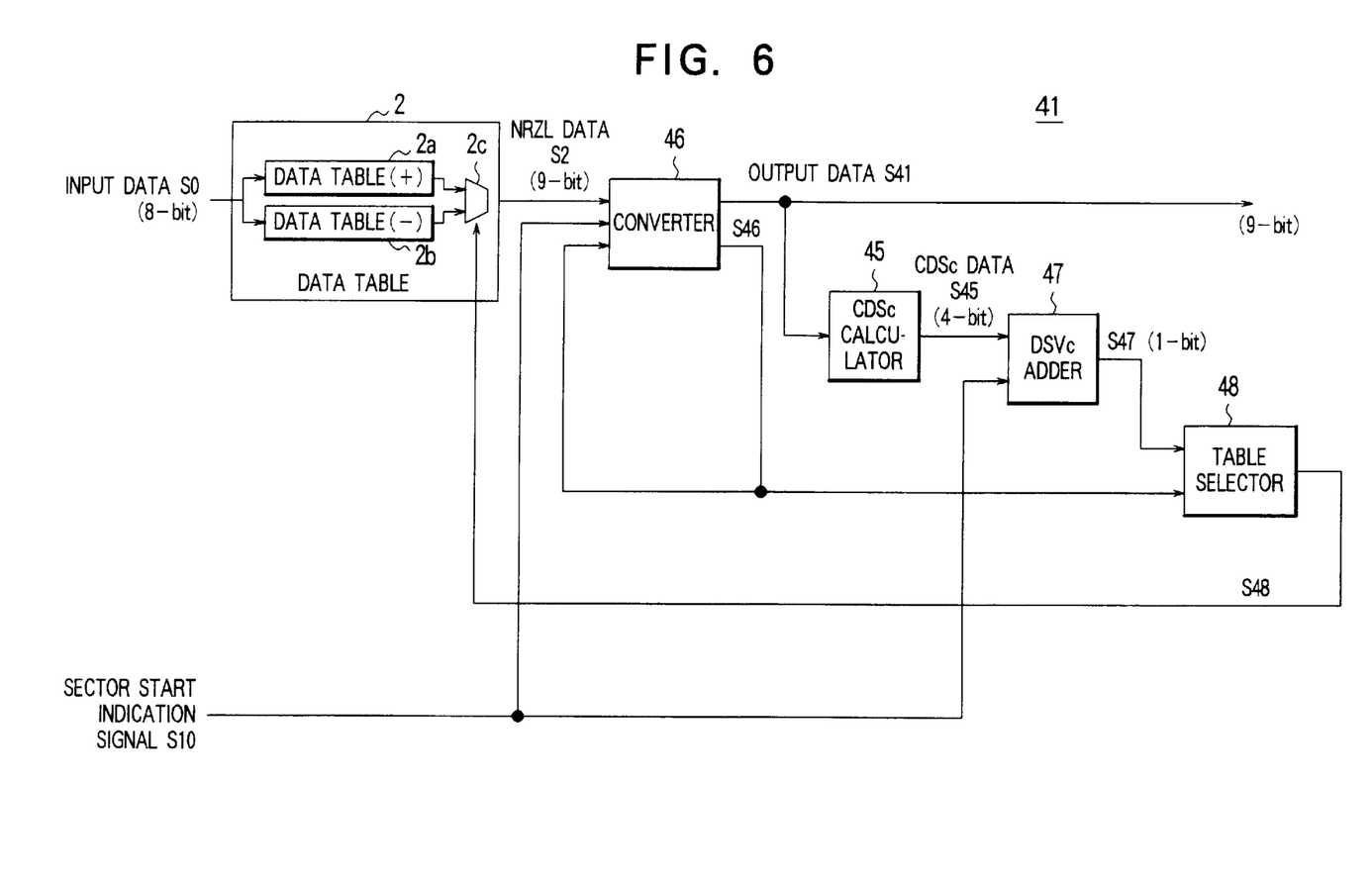
FIG. 6 is a view of the configuration of the 8/9 coding apparatus of a second embodiment of the present invention.

As opposed to this, the 8/9 coding apparatus 41 shown in FIG. 6 has the data table 2, a converter 46, a CDSc calculator 45, a DSVc adder 47, and a table selector 48.

The CDSc calculator 45 uses the 9-bit NRZI format output data S41 output from the converter 46 to calculate the 4-bit CDSc data S45.

The CDSc calculator 45 calculates the CDS with respect to the pattern obtained by inverting the 0 or 1 of the bit pattern of for example the output data S41 to calculate the CDSc data.

Further, the converter 46 generates the polarity inversion data from the NRZL data S2 and feeds back this polarity inversion data S46 again and, at the same time, outputs the same to the table selector 48. The DSVc adder 47 generates the DSVc data based on Table 3 explained in the first embodiment by using the CDSc data S45 and the sector start indication signal S10 and outputs the MSB data S47 of this DSVc data to the table selector 48.

The table selector 48 generates the table selecting signal based on the MSB data S47 and the polarity inversion data S46 and outputs this table selecting signal S48 to the selector 2c of the data table 2. The processing in the table selector 48 is the same as the processing of the table selector 18 of the first embodiment mentioned above.

According to the 8/9 coding apparatus 41, in addition to the effect of the 8/9 coding apparatus 11 of the above first embodiment, the configuration of the apparatus can be further simplified since it is not provided with the polarity table 3 and the CDS table 4.

Third Embodiment

Figure 7:
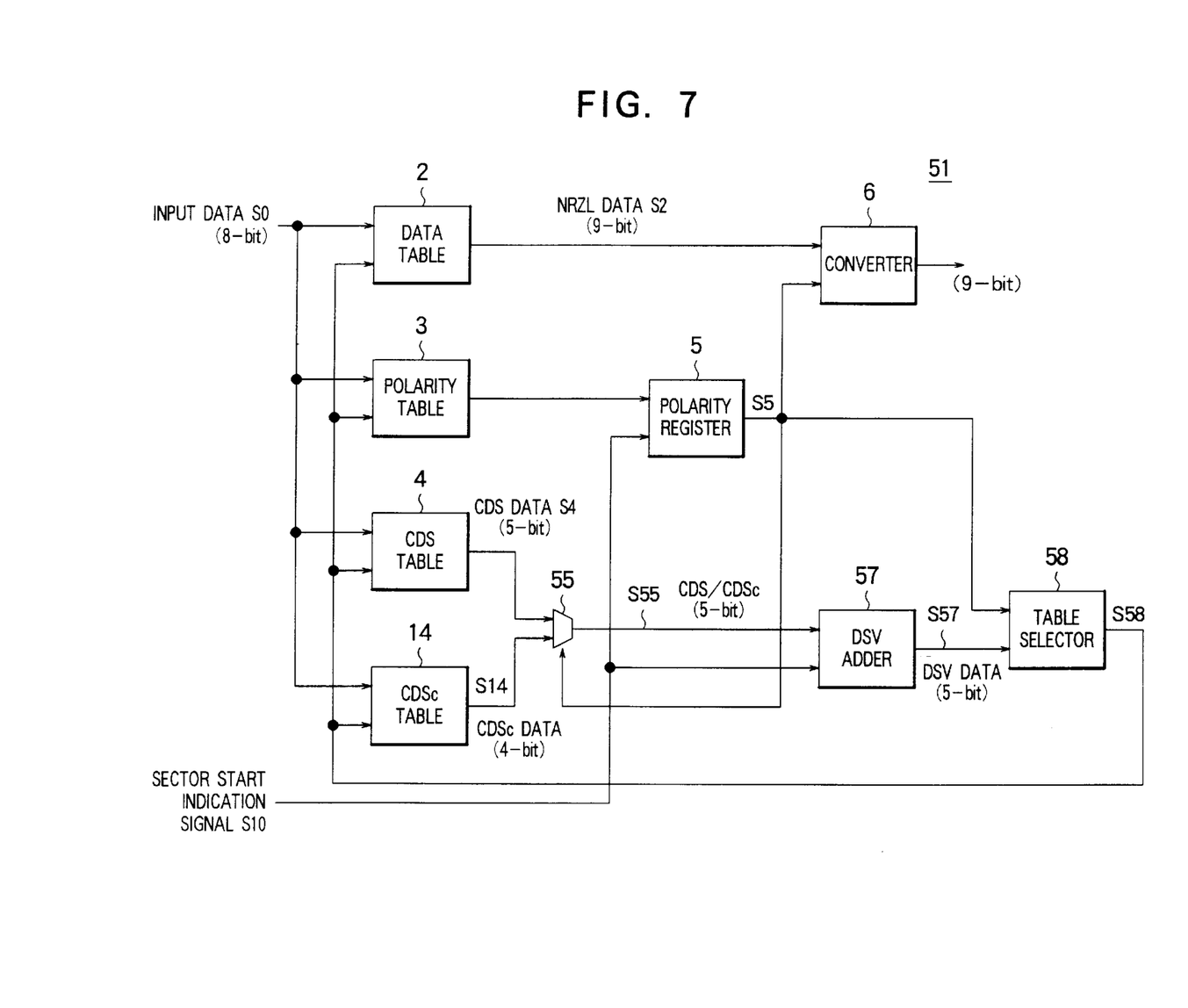
FIG. 7 is a view of the configuration of the 8/9 coding apparatus of a third embodiment of the present invention.

FIG. 7 is a view of the configuration of an 8/9 coding apparatus 51 of the third embodiment.

As shown in FIG. 7, the 8/9 coding apparatus 51 has the data table 2, a polarity table 3, a CDS table 4, a CDSc table 14, a polarity register 5, a converter 6, a selector 55, a DSV adder 57, and a table selector 58.

The 8/9 coding apparatus 51 is configured provided with the CDSc table 14 in addition to the CDS table 4 and selectively uses the CDS data S4 and the CDSc data S14 in the DSV adder 57 by the selection processing by the selector 55.

The configuration of the CDS table 4 is the same as that of the CDS table 4 of the 8/9 coding apparatus 1 shown in FIG. 1 mentioned above.

The selector 55 outputs the CDS data S4 as the selection data S55 to the DSV adder 57 when the polarity inversion data S5 indicates "−". Further, the selector 55 outputs the CDSc data S14 as the selection data S55 to the DSV adder 57 when the polarity inversion data S5 indicates "+".

The DSV adder 57 adds the DSV data heretofore and the selection data S55 and outputs the result of the addition as the DSV data S57 to the table selector 58.

Namely, by the relationship with the selection in the selector 55, the operation shown in the following Table 6 is carried out in the DSV adder 57.

TABLE 6

| Previous polarity | Next DSVc |
|---|---|
| + | DSV − CDSc |
| − | DSV + CDS |

Namely, the 8/9 coding apparatus 51 is provided with only the addition, initialization, and Sync processing functions of the DSV adder 57 by utilizing the fact that the relationship indicated by the following expression (7) is established between the CDS data and the CDSc data and selectively using the CDS data S4 and the CDSc data S14:

$$CDS\ data = -CDSc\ data \quad (7)$$

As explained above, in the 8/9 coding apparatus 51, the necessity of providing the subtraction function in the DSV adder 57 is eliminated, and the functions of the DSV adder can be simplified in comparison with the DSV adder 7 of the 8/9 coding apparatus 1 mentioned above.

Fourth Embodiment

The 8/9 coding apparatus of the fourth embodiment has the configuration of the 8/9 coding apparatus 51 of the third embodiment mentioned above without the CDS table.

Figure 8:
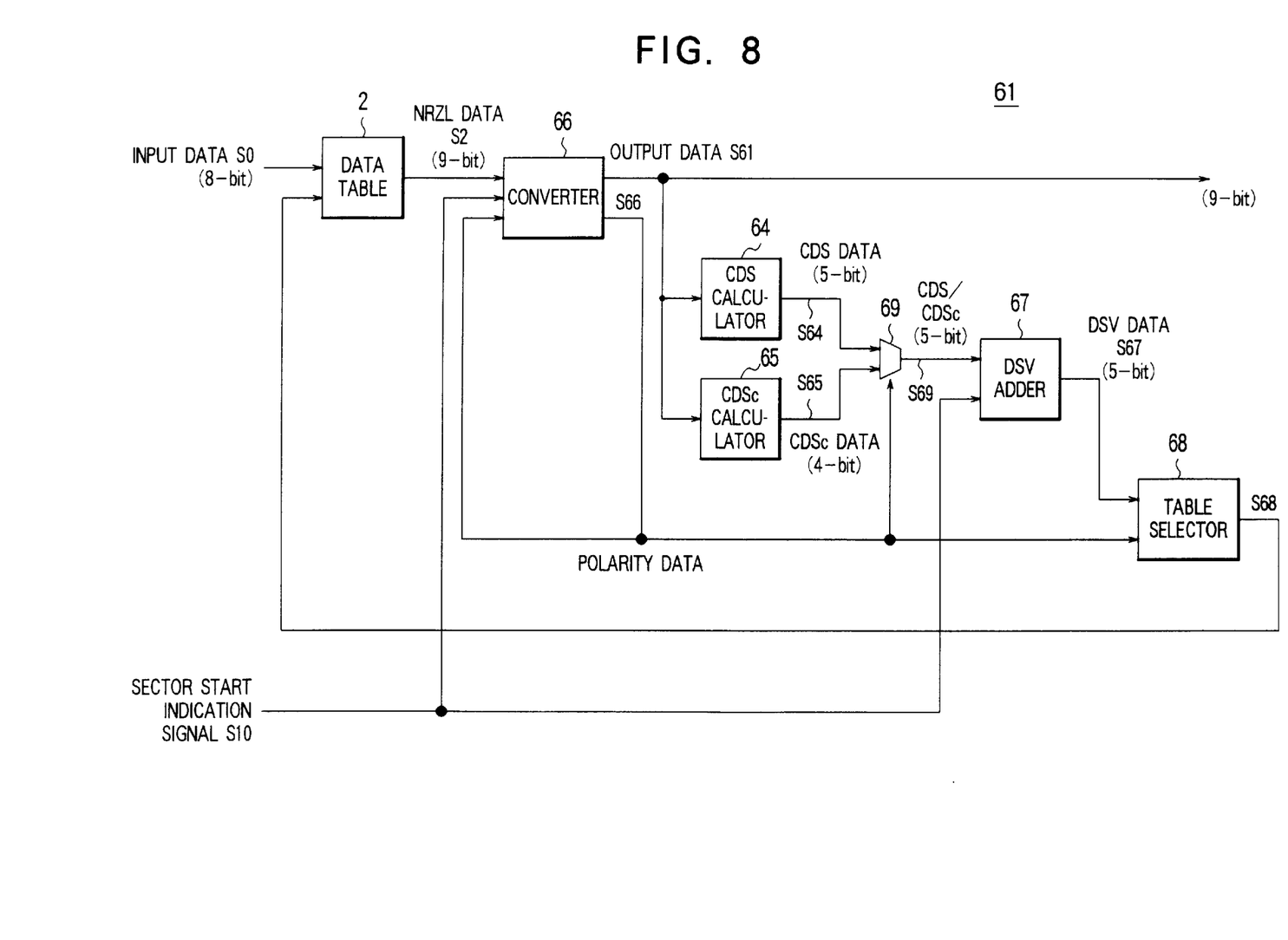
FIG. 8 is a view of the configuration of the 8/9 coding apparatus of a fourth embodiment of the present invention.

FIG. 8 is a view of the configuration of an 8/9 coding apparatus 61 of the present embodiment.

As shown in FIG. 8, the 8/9 coding apparatus 61 has the data table 2, a converter 66, a CDS calculator 64, a CDSc calculator 65, a selector 69, a DSV adder 67, and a table selector 68.

The CDS calculator 64 uses the 9-bit NRZI format output data S61 to calculate the 5-bit CDS data S64.

The CDSc calculator 65 uses the output data S61 from the converter 66 to calculate the 4-bit CDSc data S65.

The CDSc calculator 65 calculates the CDS with respect to for example the pattern obtained by inverting the 0 and 1 of the bit pattern of the output data S61 and calculates the CDSc data.

The selector 69 outputs the CDS data S64 as the selection data S69 to the DSV adder 67 when the polarity inversion data S66 from the converter 66 indicates "−". Further, the selector 69 outputs the CDSc data S65 as the selection data S69 to the DSV adder 67 when the polarity inversion data S66 indicates "+".

The converter 66 generates the polarity inversion data from the NRZL data S2, feeds back this polarity inversion data S66 again and, at the same time, outputs the same to the selector 69 and the table selector 68.

The DSV adder 67 generates the 5-bit DSV data based on the selection data S69 and the sector start indication signal S10 and outputs this DSV data S67 to the table selector 68.

At this time, by the relationship with the selection at the selector 69, the operation shown in above Table 6 is carried out in the DSV adder 67.

The table selector 68 generates the table selecting signal based on the DSV data S67 and the polarity inversion data S66 and outputs this table selecting signal S68 to the selector of the data table 2.

According to the 8/9 coding apparatus 61, in addition to the effect of the 8/9 coding apparatus 51 of the third embodiment mentioned above, the configuration of the apparatus can be further simplified since it is not provided with the polarity table and CDS table.

Fifth Embodiment

An 8/9 coding apparatus of the fifth embodiment is obtained by simultaneously applying the 8/9 coding apparatus 11 of the first embodiment and the 8/9 coding apparatus 51 of the third embodiment.

Figure 9:
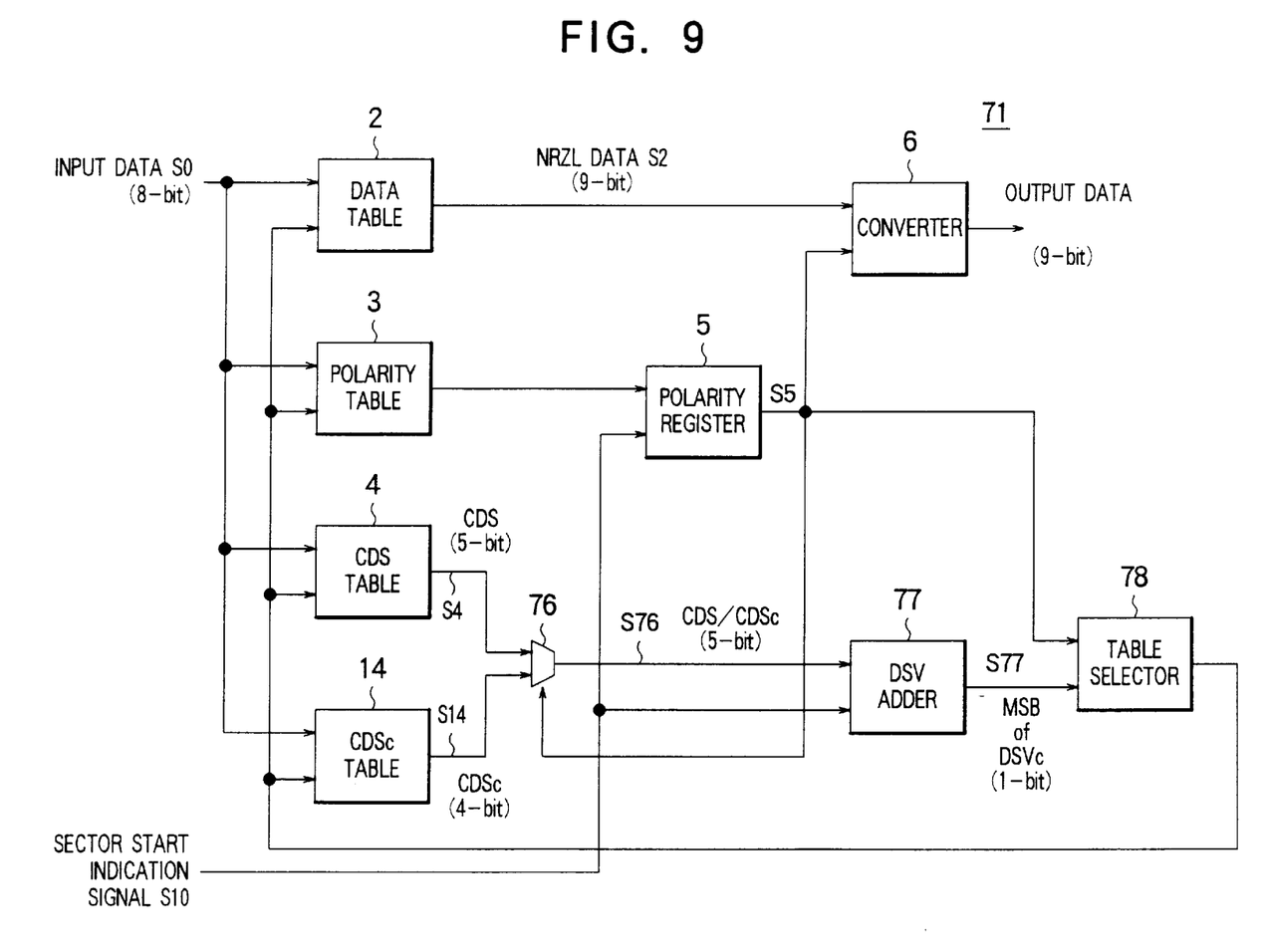
FIG. 9 is a view of the configuration of the 8/9 coding appatatus of a fifth embodiment of the present invention.

FIG. 9 is a view of the configuration of an 8/9 coding apparatus 71 of the present embodiment.

As shown in FIG. 9, the 8/9 coding apparatus 71 has a data table 2, a polarity table 3, a CDS table 4, a CDSc table 14, a polarity register 5, a converter 6, a selector 76, a DSVc adder 77, and a table selector 78.

Namely, the 8/9 coding apparatus 71 is configured with the selector 55 and the DSV adder 57 of the 8/9 coding apparatus 51 shown in FIG. 7 replaced by the selector 76 and the DSVc adder 77.

The selector 76 outputs the CDS data S4 as the selection data S76 to the DSVc adder 77 when the polarity inversion data S5 from the polarity register 5 indicates "+". Further, the selector 76 outputs the CDSc data S14 as the selection data S76 to the DSVc adder 77 when the polarity inversion data S5 from the polarity register 5 indicates "−".

The DSVc adder 77 calculates the DSVc value of the period from the head of the sector to the present time as shown in the following Table 10 by using the sector start indication signal S10, the selection data S76, and the polarity inversion data S5 and holds the result of the calculation. Further, the DSVc adder 77 outputs the MSB data S77 as the result of this calculation to the table selector 78.

TABLE 7

| Previous polarity | Next DSVc |
|---|---|
| + | DSVc − CDS |
| − | DSVc + CDSc |

The table selector 78 performs the same processing as that of the table selector 18 shown in FIG. 4.

According to the 8/9 coding apparatus 71, the DSVc adder 77 performs only addition, therefore the configuration of the DSVc adder 77 can be simplified in comparison with the DSVc adder 17 of the first embodiment having functions of both of addition and subtraction.

Sixth Embodiment

Figure 10:
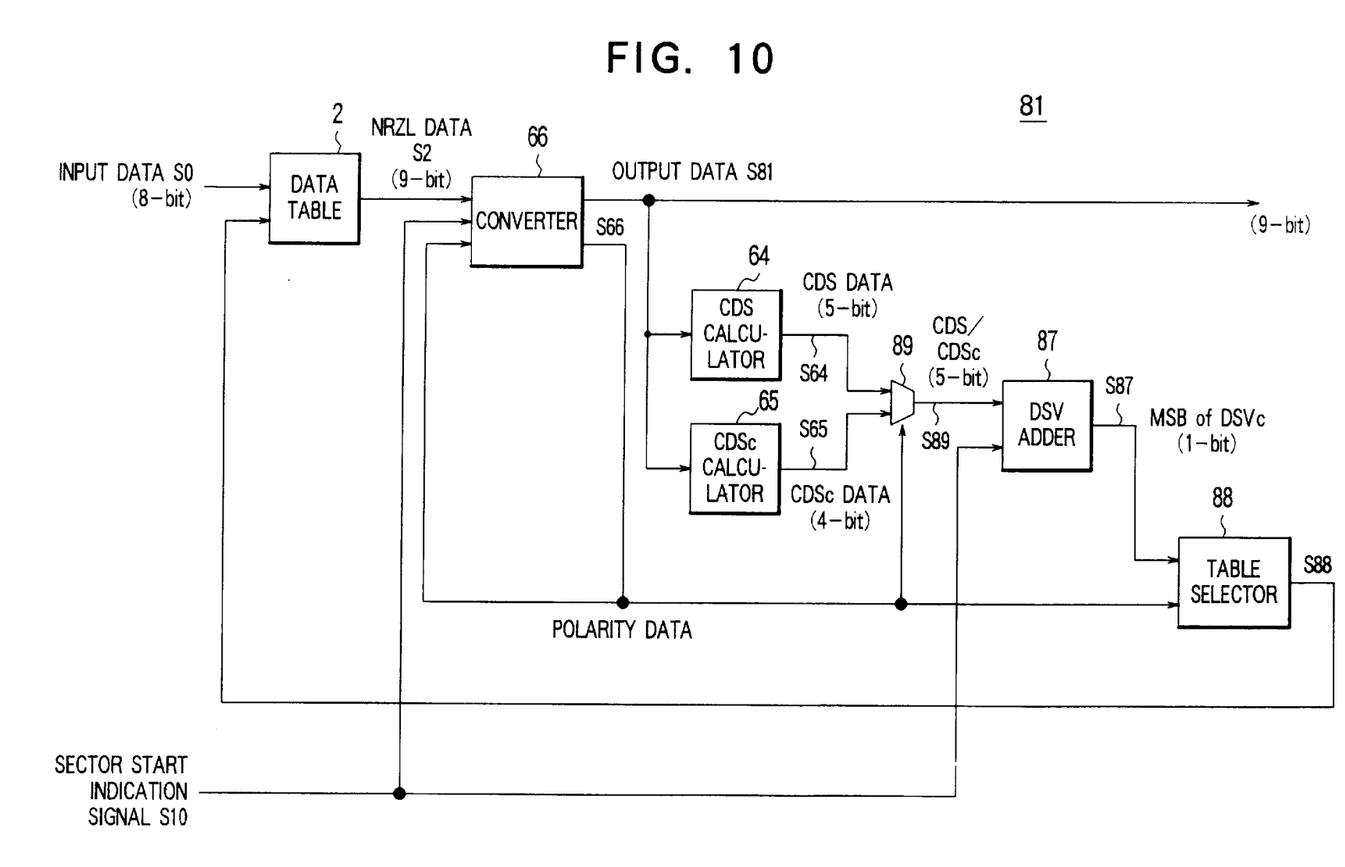
FIG. 10 is a view of the configuration of the 8/9 coding apparatus of a sixth embodiment of the present invention.

FIG. 10 is a view of the configuration of an 8/9 coding apparatus 81 of the sixth embodiment.

As shown in FIG. 10, the 8/9 coding apparatus 81 has a data table 2, a converter 66, a CDS calculator 64, a CDSc calculator 65, a selector 89, a DSVc adder 87, and a table selector 88.

The CDS calculator 64 uses the 9-bit NRZI format output data S81 output from the converter 66 to calculate the 5-bit CDS data S64.

The CDSc calculator 65 uses the output data S81 from the converter 66 to calculate the 4-bit CDSc data S65.

The CDSc calculator 65 calculates the CDS with respect to for example the pattern obtained by inverting the 0 and 1 of the bit pattern of the output data S81 and calculates the CDSc data.

The selector 89 outputs the CDS data S64 as the selection data S89 to the DSVc adder 87 when the polarity inversion data S66 from the converter 66 indicates "+". Further, the selector 89 outputs the CDSc data S65 as the selection data S89 to the DSV adder 87 when the polarity inversion data S66 indicates "−".

The converter 66 generates the polarity inversion data from the NRZL data S2, feeds back this polarity inversion data S66 again and, at the same time, outputs the same to the selector 89 and the table selector 88.

The DSVc adder 87 generates the DSVc data based on the selection data S89 and the sector start indication signal S10 and outputs the MSB data S87 of this DSVc data to the table selector 88.

At this time, by the relationship with the selection at the selector 89, the operation shown in above Table 7 is carried out in the DSVc adder 87.

The table selector 88 generates the table selecting signal based on the MSB data S87 and the polarity inversion data S86 and outputs this table selecting signal S88 to the selector of the data table 2. The processing at the table selector 88 is the same as the processing of the table selector 18 of the first embodiment mentioned above.

According to the 8/9 coding apparatus 81, in addition to the effect of the 8/9 coding apparatus 71 of the fifth embodiment mentioned above, the configuration of the apparatus can be further simplified since it is not provided with the polarity table and CDS table.

The present invention is not limited to the above embodiments. In the embodiments, the explanation was made with reference to the CDSc of the complement of 2 of the CDS and the DSV calculated from the CDSc as the DSVc. As explained in the third embodiment, the relationship of CDSc=−CDS stands, so it is clear that exactly the same effects as all of the embodiments of the invention explained above can be obtained even if the value of CDS multiplied by minus 1 is used as CDSn and the DSV calculated from CDSn is used as DSVn.

In addition, in the 8/9 coding apparatus 11 shown in FIG. 4, it is also possible to adopt a configuration in which the polarity table 3 is not provided and the polarity data S5 is generated from the output data S11 of the converter 6.

As explained above, according to the 8/9 coding apparatus of the present invention and the method of same, the bit length of data to be handled can be reduced, and the simplification of the circuit structure and the faster speed of processing can be achieved.

What is claimed is:

1. An 8/9 coding apparatus which suppresses the DC component of input data to be recorded on a magnetic tape by converting the 8-bit input data to 9-bit coded data, comprising:

a complement digital sum variation (DSV) calculating means for calculating a complement DSV from a complement CDS which is a complement of 2 of a code word digital sum (CDS) found from a change in a waveform of an NRZ modulated 9-bit word, a table selecting signal generating means for receiving as input a most significant bit (MSB) of the complement DSV output from said complement DSV calculating means and polarity data relating to inversion of the polarity of the input data and generating a table selecting signal based on rules of conversion for converting 8-bit input data to 9-bit coded data, and a data table having a first data table and a second data table which are selectively used in accordance with said table selecting signal generated by said table selecting signal generating means and indicate a correspondence between 8-bit input data and 9-bit coded data.

2. An 8/9 coding apparatus as set forth in claim 1, further comprising:

a complement CDS table having a first complement CDS table and a second complement CDS table which are selectively used in accordance with the table selecting signal based on the rules of conversion for converting the 8-bit input data to the 9-bit coded data.

3. An 8/9 coding apparatus as set forth in claim 2, further comprising a CDS table having a first CDS table and a second CDS table which are selectively used in accordance with the table selecting signal based on the rules of conversion for converting the 8-bit input data to the 9-bit coded data, and a selecting means for selectively outputting the CDS from said CDS table and the complement CDS from the complement CDS table in accordance with polarity data relating to inversion of polarity of the input data.

4. An 8/9 coding apparatus as set forth in claim 1, further comprising a complement CDS calculating means for calculating the complement CDS from the 9-bit coded data output from said data table.

5. An 8/9 coding apparatus as set forth in claim 4, further comprising a CDS calculating means for calculating said CDS from said 9-bit coded data output from said data table based on the rules of conversion for converting 8-bit input data to 9-bit coded data and a selecting means for selectively outputting the CDS from said CDS calculating means and the complement CDS from said complement CDS calculating means in accordance with polarity data relating to inversion of the polarity of the input data.

6. An 8/9 coding apparatus which suppresses the DC component of input data to be recorded on a magnetic tape by converting the 8-bit input data to 9-bit coded data, comprising:

a table of a code word digital sum (CDS) found from a change in a waveform of an NRZ modulated 9-bit word, said CDS table having a first CDS table and a second CDS table which are selectively used in accordance with a table selecting signal based on rules of conversion for converting the 8-bit input data to the 9-bit coded data, a table of a complement of 2 of the above CDS (complement CDS) having a first complement CDS table and a second complement CDS table which are selectively used in accordance with the table selecting signal based on the rules of conversion for converting the 8-bit input data to the 9-bit coded data, and a selecting means for selectively outputting the CDS from said CDS table and the complement CDS from the complement CDS table in accordance with polarity data relating to inversion of polarity of the input data.

7. An 8/9 coding apparatus which suppresses the DC component of input data to be recorded on a magnetic tape by converting the 8-bit input data to 9-bit coded data, comprising:

a means for calculating a code word digital sum (CDS) found from a change in a waveform of an NRZ modulated 9-bit word, a means for calculating a complement of 2 of said CDS, that is, a complement CDS, and a selecting means for selectively outputting the CDS from said CDS calculating means and the complement CDS from the complement CDS calculating means in accordance with polarity data relating to inversion of polarity of the input data.

8. An 8/9 coding method which suppresses the DC component of input data for recording on a magnetic tape by converting the 8-bit input data to 9-bit coded data, comprising the steps of:

finding a complement code word digital sum (CDS), that is, a complement of 2 of a CDS found from a change in a waveform of an NRZ modulated 9-bit word, calculating a complement digital sum variation (DSV) from the value of the complement CDS, receiving as input a most significant bit (MSB) of the complement DSV and polarity data relating to inversion of the polarity of the input data and generating a table selecting signal for selecting a table based on rules of conversion for converting 8-bit input data to 9-bit coded data, and selecting using a first data table and a second data table of a data table which indicate a correspondence between 8-bit input data and 9-bit coded data in accordance with the table selecting signal.

9. An 8/9 coding apparatus which suppresses the DC component of input data to be recorded on a magnetic tape by converting the 8-bit input data to 9-bit coded data, comprising:

a negative digital sum variation (DSVn) calculating means for calculating a DSVn from a value of a negative complement code word digital sum (CDSn) obtained by multiplying by minus 1 a CDS found from a change in a waveform of an NRZ modulated 9-bit word, a table selecting signal generating means for receiving as input a most significant bit (MSB) of the DSVn output from said DSVn calculating means and polarity data relating to inversion of the polarity of the input data and generating table selecting signal based on rules of conversion for converting 8-bit input data to 9-bit coded data, and a data table having a first data table and a second data table which are selectively used in accordance with said the table selecting signal generated by said table selecting signal generating means and indicate a correspondence between 8-bit input data and 9-bit coded data.

10. An 8/9 coding apparatus as set forth in claim 9, further comprising:

a CDSn table having a first CDSn table and a second CDSn table which are selectively used in accordance with the table selecting signal based on the rules of conversion for converting the 8-bit input data to the 9-bit coded data.

11. An 8/9 coding apparatus as set forth in claim 10, further comprising a CDS table having a first CDS table and a second CDS table which are selectively used in accordance with the table selecting signal based on the rules of conversion for converting the 8-bit input data to the 9-bit coded data, and a selecting means for selectively outputting the CDS from said CDS table and the CDSn from the CDSn table in accordance with polarity data relating to inversion of polarity of the input data.

12. An 8/9 coding apparatus as set forth in claim 9, further comprising a CDSn calculating means for calculating the CDSn from the 9-bit coded data output from said data table.

13. An 8/9 coding apparatus as set forth in claim 12, further comprising a CDS calculating means for calculating said CDS from said 9-bit coded data output from said data table based on the rules of conversion for converting 8-bit input data to 9-bit coded data and a selecting means for selectively outputting the CDS from said CDS calculating means and the CDSn from said CDSn calculating means in accordance with polarity data relating to inversion of the polarity of the input data.

14. An 8/9 coding apparatus which suppresses the DC component of input data to be recorded on a magnetic tape by converting the 8-bit input data to 9-bit coded data, comprising:

a table of a code word digital sum (CDS) found from a change in a waveform of an NRZ modulated 9-bit word, said CDS table having a first CDS table and a second CDS table which are selectively used in accordance with a table selecting signal based on rules of conversion for converting the 8-bit input data to the 9-bit coded data, a table of a negative CDS (CDSn) obtained by multiplying the CDS by minus 1, said CDSn table having a first CDSn table and a second CDSm table which are selectively used in accordance with the table selecting signal based on the rules of conversion for converting the 8-bit input data to the 9-bit coded data, and a selecting means for selectively outputting the CDS from said CDS table and the CDSn from the CDSn table in accordance with polarity data relating to inversion of polarity of the input data.

15. An 8/9 coding apparatus which suppresses the DC component of input data to be recorded on a magnetic tape by converting the 8-bit input data to 9-bit coded data, comprising:

a means for calculating a code word digital sum (CDS) found from a change in a waveform of an NRZ modulated 9-bit word, a means for calculating a negative CDS (CDSn) by multiplying the CDS by minus 1, and a selecting means for selectively outputting the CDS from said CDS calculating means and the CDSn from the CDSn calculating means in accordance with polarity data relating to inversion of polarity of the input data.

16. An 8/9 coding method which suppresses the DC component of input data for recording on a magnetic tape by converting the 8-bit input data to 9-bit coded data, comprising the steps of:

finding a negative complement code word digital sum (CDSn) obtained by multiplying a CDS found from a change in a wave form of an NRZ modulated 9-bit word by minus 1 calculating a complement digital sum variation (DSV) from the value of the complement CDS, receiving as input a most significant bit (MSB) of the complement DSV and polarity data relating to inversion of the polarity of the input data and generating a table selecting signal for selecting a table based on rules of conversion for converting 8-bit input data to 9-bit coded data, and selecting using a first data table and a second data table of a data table which indicate a correspondence between 8-bit input data and 9-bit coded data in accordance with the table selecting signal.

* * * * *